(12) United States Patent
Ripper et al.

(10) Patent No.: US 6,295,977 B1
(45) Date of Patent: Oct. 2, 2001

(54) METHOD AND DEVICE FOR SIMULTANEOUSLY CUTTING OFF A MULTIPLICITY OF WAFERS FROM A WORKPIECE

(75) Inventors: Bert Ripper, Postbauer-Heng; Christian Andrae, Tüssling; Karl Egglhuber, Hebertsfelden; Holger Lundt, Burghausen; Helmut Kölker, München; Jochen Greim, Buchenberg, all of (DE)

(73) Assignees: Wacker Chemie GmbH, Munich; Wacker Siltronic Gesellschaft für Halbleitermaterialien AG, Burghausen, both of (DE)

( * ) Notice: Subject to any disclaimer, the term of this patent is extended or adjusted under 35 U.S.C. 154(b) by 0 days.

(21) Appl. No.: 09/434,582

(22) Filed: Nov. 4, 1999

(30) Foreign Application Priority Data

Nov. 5, 1998 (DE) .............................. 198 51 070

(51) Int. Cl.⁷ ....................................... B28D 1/06
(52) U.S. Cl. ..................... 125/16.02; 125/12; 125/16.01; 125/35
(58) Field of Search .................. 125/12, 16.01, 125/16.02, 35

(56) References Cited

U.S. PATENT DOCUMENTS

5,564,409 * 10/1996 Bonzo et al. .......................... 125/12
5,857,454 * 1/1999 Shibaoka ............................ 125/16.02
6,024,080 * 2/2000 Hodsen ................................. 125/21

FOREIGN PATENT DOCUMENTS

07-304030 11/1995 (JP).

OTHER PUBLICATIONS

English Abstract Corresponding To FP07–304030.

* cited by examiner

Primary Examiner—Joseph J. Hail, III
Assistant Examiner—Shantese McDonald
(74) Attorney, Agent, or Firm—Collard & Roe, P.C.

(57) ABSTRACT

A method is for simultaneously cutting off a multiplicity of wafers from a hard, brittle workpiece which has a longitudinal axis and a peripheral surface. The workpiece is guided, by means of a translational relative movement, directed perpendicular to the longitudinal axis, between the workpiece and a wire web of a wire saw with the aid of a feed device, through the wire web which is formed by a sawing wire. The workpiece is rotated about the longitudinal axis while the wafers are being cut off. There is also a wire saw which is suitable for carrying out the method and has a device for holding and for rotating the workpiece about the longitudinal axis.

18 Claims, 5 Drawing Sheets

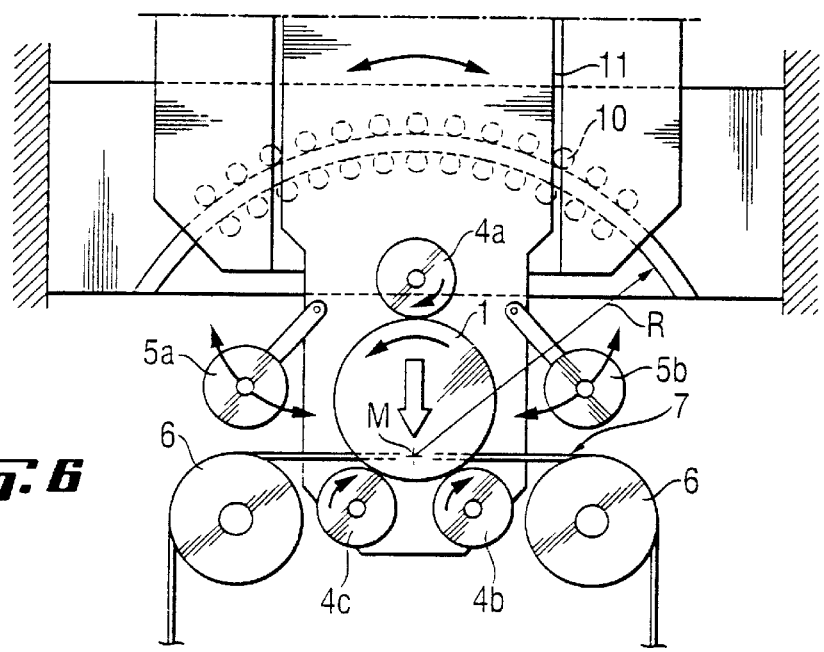
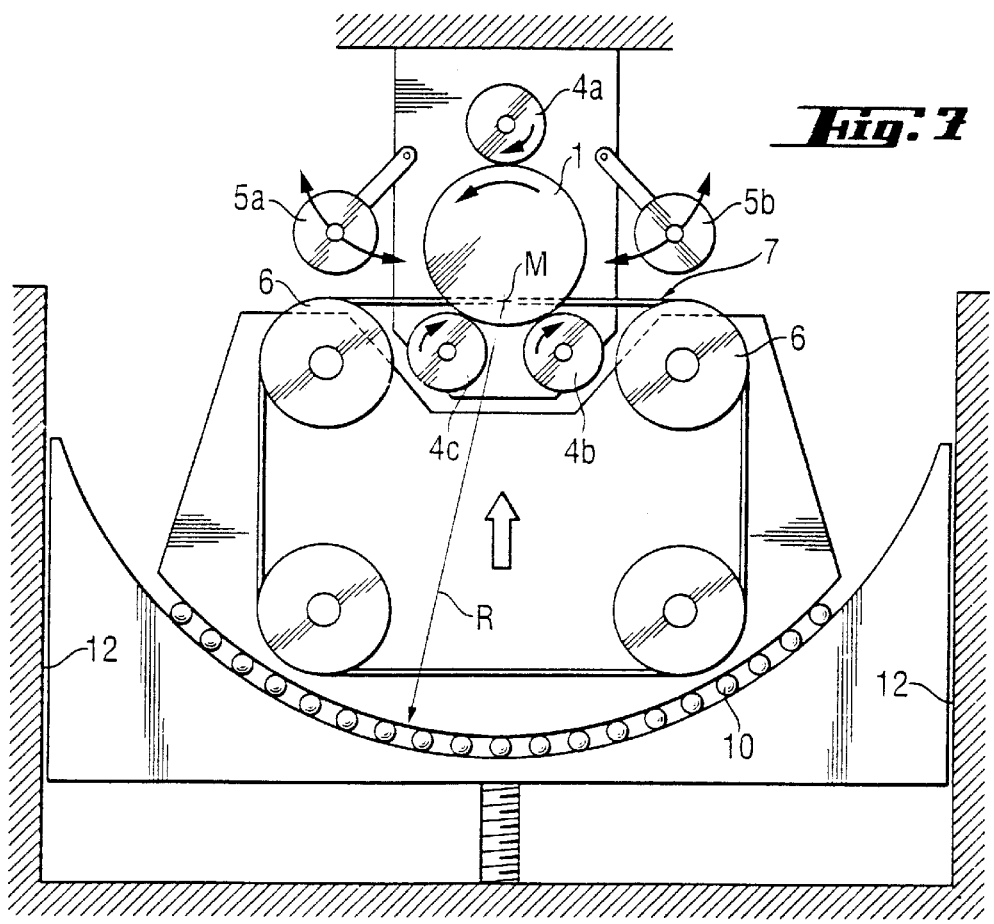

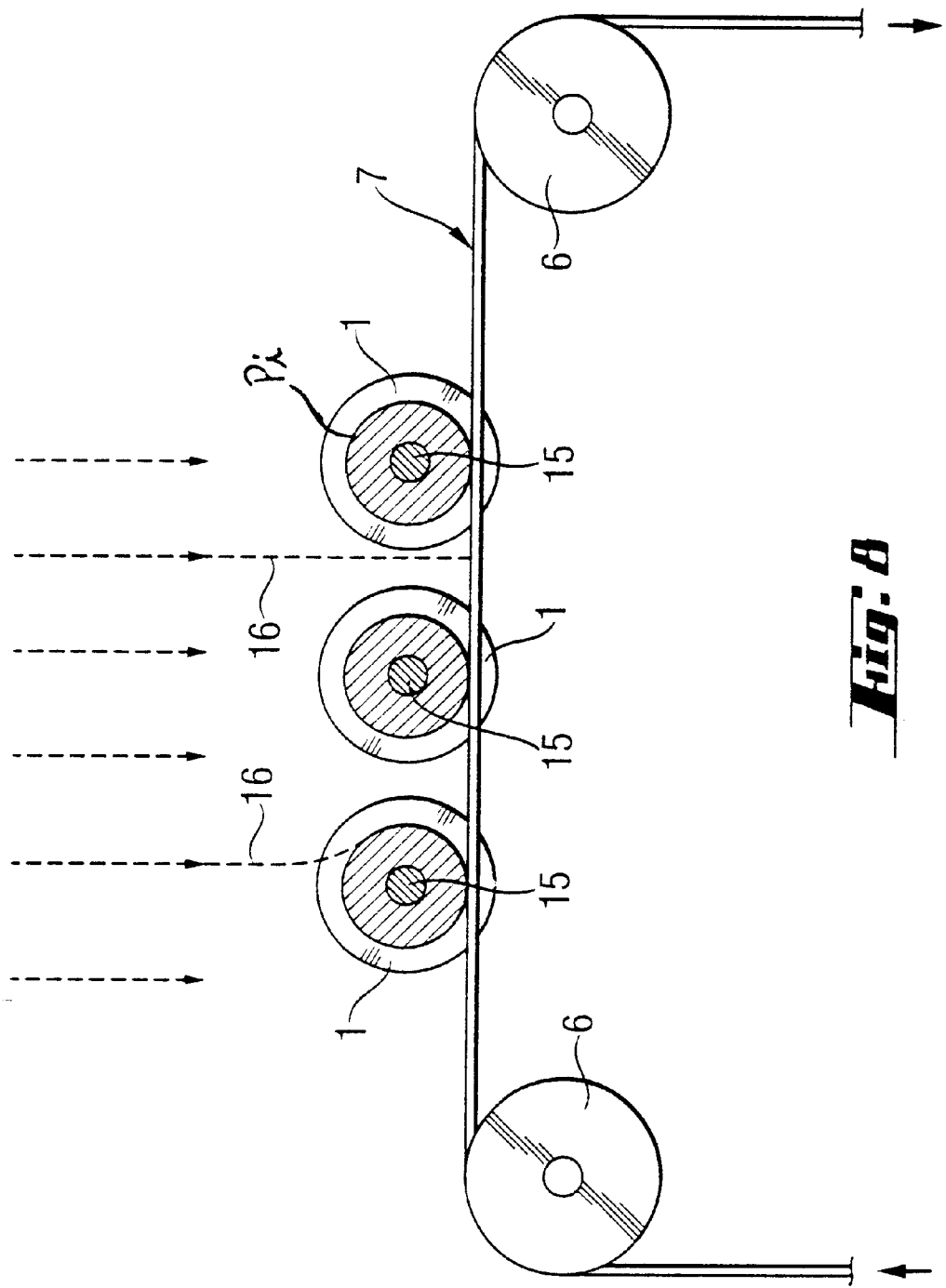

METHOD AND DEVICE FOR SIMULTANEOUSLY CUTTING OFF A MULTIPLICITY OF WAFERS FROM A WORKPIECE

BACKGROUND OF THE INVENTION

1. Field of the Invention

The present invention relates to a method for simultaneously cutting off a multiplicity of wafers from a hard, brittle workpiece. The invention also relates to a device which is suitable for carrying out the method.

2. The Prior Art

The invention is useful in particular for the production of semiconductor wafers. For such applications, wire saws which are able to cut off a multiplicity of wafers from a workpiece in a single operation are increasingly being used. U.S. Pat. No. 5,771,876 describes the operating principle of a wire saw which is suitable for producing semiconductor wafers. The workpiece is guided through the wire web of the wire saw by a feed movement and, when it penetrates through the wire web, is divided into wafers. Wire saws which operate with a slurry are known, as well as other wire saws in which abrasive grains are fixedly bonded to the sawing wire. When cutting off semiconductor wafers from a crystal, it is usual for the crystal to be fixed at a mounting beam. The sawing wire then cuts the crystal at the end of the method. The mounting beam is a supporting body which is adhesively bonded or cemented to the peripheral surface of the crystal. After they have been cut off, the semiconductor wafers formed remain fixed to the mounting beam in the manner of the teeth of a comb and can thus be removed from the wire saw. Later, the residual mounting beam is removed from the semiconductor wafers.

When working with this kind of wire saws, the sawing wire may leave marks and waves on the sides of the wafers, which is undesirable. This is because they require more material to be removed during subsequent processes and because they make it difficult to measure the thickness of the wafers, and also constitute deviations from the desired wafer shape. For this reason, they have to be removed, for example by grinding, resulting in the loss of additional material.

JP-08-85053 A describes a method in which the workpiece is cemented to a mounting beam and, when the wafers are being cut off, carries out a pivoting movement, so that the sawing wire leaves a curved base in the sawing gap when penetrating into the workpiece.

SUMMARY OF THE INVENTION

It is an object of the present invention to provide an improved sawing method.

The invention relates to a method for simultaneously cutting off a multiplicity of wafers from a hard, brittle workpiece which has a longitudinal axis and a peripheral surface, the workpiece being guided, by means of a translational relative movement, directed perpendicular to the longitudinal axis, between the workpiece and a wire web of a wire saw with the aid of a feed device, through the wire web which is formed by a sawing wire, wherein the workpiece is rotated about the longitudinal axis while the wafers are being cut off.

The invention furthermore relates to a wire saw for carrying out the method, which saw has a device for holding and for rotating the workpiece about the longitudinal axis.

In addition to the advantage that there are fewer marks made when cutting off wafers and the fact that the wafer yield increases, since less material has to be sacrificed when treating the sides using abrasive tools, there are further advantages associated with the invention. Examples include improvements in characteristic variables which, as with TTV (total thickness variation) and thickness distribution, describe the shape of the wafers produced. Therefore, wafers produced according to the invention can be directly subjected to double side polishing, without an intermediate material-removing treatment. Furthermore, the full slicing capacity increases when the method is employed, since a feed path which corresponds to half the diameter of the workpiece is sufficient to allow the wafers to be cut off completely. Shorter sawing times can be achieved by suitably selecting the length over which the sawing wire acts and the feed rate. When cutting off semiconductor wafers, it is possible to dispense with the attachment of a mounting beam before cutting and the removal of the residual mounting beam after cutting. Finally, the invention can also be used to obtain semiconductor wafers with a defined bow. To achieve this, the rotational movement can be combined with an axial feed movement of the sawing wire or of the workpiece, resulting, with a radially changed material-removal volume, in a corresponding abrasion of material. The axial feed movement of the sawing wire or of the workpiece may, for example, be achieved by measures which are described in the German Patent Application Serial Number 197 39 966.5.

The invention provides further advantages compared to known methods in which a slurry is employed. During rotation of the workpiece, the slurry is distributed within the sawing gap more successfully, thus ensuring that the sawing gap is provided with sufficient slurry. The rotation of the workpiece about the longitudinal axis may also lead to direct substantial contact between the sawing wire and the workpiece in the cutting gap and thus to a high sawing pressure. In this way, and by possibly increasing the relative speed of the sawing wire when workpiece and sawing wire are rotating in opposite directions, it is possible to accelerate the speed at which the wafers are cut off. Any reduction in the peripheral speed of the sawing wire that may be required can be compensated for by a corresponding increase in the rotational speed of the workpiece. The above advantages overall make the method according to the invention more economical.

Although the invention offers a particularly large number of advantages when cutting off semiconductor wafers from a crystal, it is not limited to this area. It may also be employed with particular preference for cutting off wafers which are to be processed further to form hard disks. In contrast to crystals, which are present in the form of solid bodies, wafers which are to be processed to form hard disks are cut off workpieces which, since they have an axial hole, are rotationally symmetrical hollow bodies.

The workpieces are preferably made from hard brittle material, such as silicon or gallium arsenide, if semiconductor material is involved, and from silicon carbide if material for producing hard disks is involved.

In the context of the invention, a longitudinal axis of the workpiece is to be understood as meaning the geometric center of the workpiece. The workpiece extends in a rotationally symmetrical manner about this axis. A crystal made from semiconductor material is generally ground in such a way that this axis coincides with a preferred crystal axis or forms a defined angle with respect to the preferred crystal axis.

The invention provides for the workpiece to be rotated about the longitudinal axis when wafers are being cut off.

Thus there are various options available to the user in this context. For example, the direction of rotation may be maintained or may be changed periodically or according to a defined program. In the event of the direction of rotation being changed, the workpiece may be rotated for longer in one direction than in the opposite direction, or may be rotated for equal lengths of time in each direction of rotation.

If the workpiece is a solid crystal made from semiconductor material, it is preferable to divide this crystal into wafers without the crystal being joined to a mounting beam. It is possible that the mounting beam may be cemented to the outer peripheral surface of the solid crystal. However, in this case, the angle of rotation is to be limited.

In the case of a workpiece which is designed as a hollow body, a support body, for example a bar made from glass, graphite, metal or plastic, is to be joined to the inner peripheral surface of the workpiece in the cavity in the workpiece. This support body is required in order to rotate the workpiece.

When using a mounting beam or some other form of support body, the wafers are cut off until the sawing wire of the wire web starts to cut into the support body. The wafers which have been cut off thus remain fixed to the rest of the support body.

The angle through which the workpiece is rotated when the wafers are being cut off is preferably greater than 0° and less than 360°, if a mounting beam is adhesively bonded or cemented on the peripheral surface of the workpiece. An angle of rotation of from 50 to 355° is particularly preferred. If no such mounting beam is used, or if a workpiece which is designed as a hollow body is being divided into wafers, the angle of rotation should be greater than 0°, preferably should be at least 5° and may be any value above this.

According to a preferred embodiment of the method, the workpiece is held by spindle sleeves at the start of the operation of cutting off the wafers and is held by rollers at the end of the operation of cutting off the wafers, the spindle sleeves acting on end sides of the workpiece and the rollers acting on the peripheral surface of the workpiece. This method is suitable for solid workpieces, such as crystals made from semiconductor material.

In the case of workpieces which are designed as hollow bodies, the spindle sleeves act on the support body which is located in the cavity in the workpiece. They rotate the support body and thus also the workpiece about its longitudinal axis.

According to a further preferred embodiment of the method, there is provision for a pivoting movement to be superimposed on the rotary movement of the workpiece about the longitudinal axis. The workpiece is additionally pivoted about an axis of rotation which lies parallel to the longitudinal axis of the workpiece, particularly preferably at a location at which the sawing wire penetrates into the workpiece.

According to another preferred embodiment of the method, a plurality of workpieces are arranged next to one another and the wafers are cut off from the workpieces simultaneously. The workpieces are either arranged in such a way that their longitudinal axes intersect a straight line at right angles or in such a way that their longitudinal axes intersect a curved line at right angles. The curvature of this line corresponds to expected bending of the wire web when the wafers are being cut off.

BRIEF DESCRIPTION OF THE DRAWINGS

Other objects and features of the present invention will become apparent from the following detailed description considered in connection with the accompanying drawings which disclose embodiments of the present invention. It should be understood, however, that the drawings are designed for the purpose of illustration only and not as a definition of the limits of the invention.

In the drawings, wherein similar reference characters denote similar elements throughout the several views:

FIG. 6 shows a wire saw with a pivoting device and a feed device, which brings about a linear movement of the workpiece while the cutting head remains immobile in translational terms;

FIG. 7 shows a wire saw with a pivoting device and a feed device which brings about a linear movement of the cutting head while the workpiece remains immobile in translational terms; and FIG. 8 shows how a plurality of workpieces which are formed as hollow bodies can be cut into wafers simultaneously.

DETAILED DESCRIPTION OF PREFERRED EMBODIMENTS

Turning now in detail to the drawings, FIGS. 1 to 6 show the workpieces to be solid bodies. However, the device shown can also be used without modification for cutting off wafers from a workpiece which is formed as a hollow body. Furthermore, the wire saw illustrated may be designed both for operation with a slurry and for operation with sawing wire which is coated with abrasive grains, for example diamond.

Figure 1:
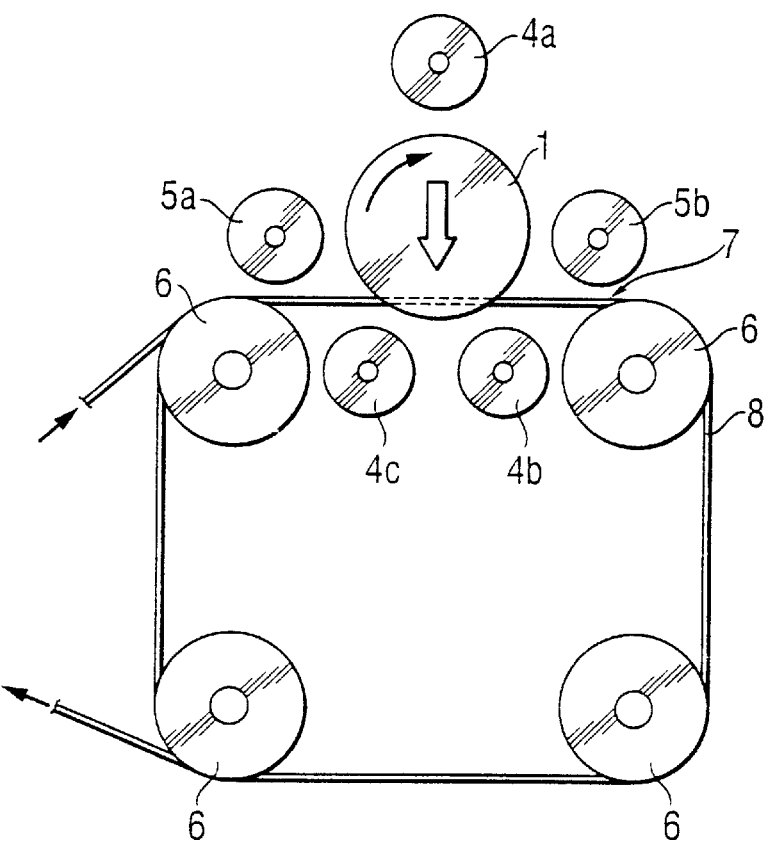
FIG. 1 diagrammatically shows a side view of the cutting head of a wire saw at the beginning of the operation of cutting off wafers from a workpiece.
Figure 2:
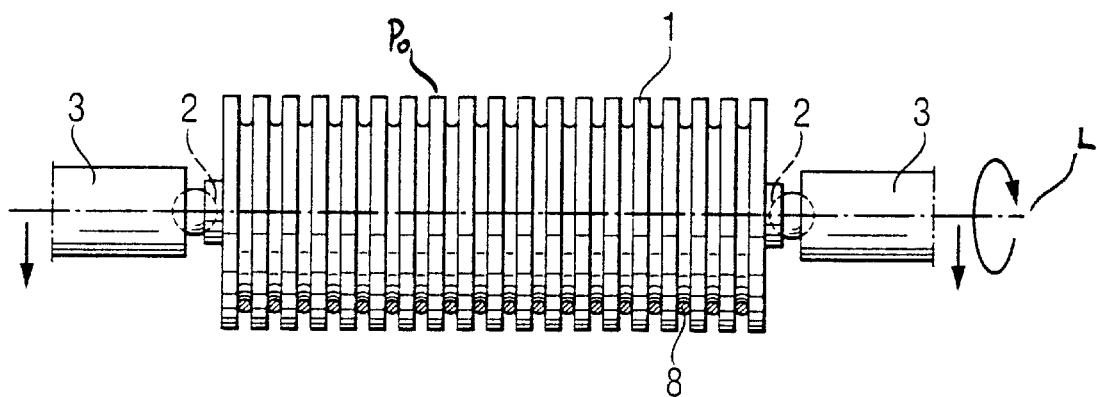
FIG. 2 shows the workpiece, which at this time is clamped between spindle sleeves.

FIG. 1 shows the situation shortly after the start of the operation of cutting off wafers. The workpiece 1, which is, for example, a single crystal made from silicon, is guided toward the wire web 7 of the wire saw by means of a translational feed movement. The sawing wire 8 runs round wire-guide rollers 6, which form a cutting head. There is no support body cemented to the outer peripheral surface $P_o$ of the solid workpiece 1. The sawing wire 8 penetrates into the workpiece as a result of the feed movement. At this time, the rollers 4a, 4b, 4c, 5a and 5b are not yet active in the method. As shown in FIG. 2, the workpiece 1 is centered by centering means 2 and is held by spindle sleeves 3 and rotated about the longitudinal axis L.

Figure 3:
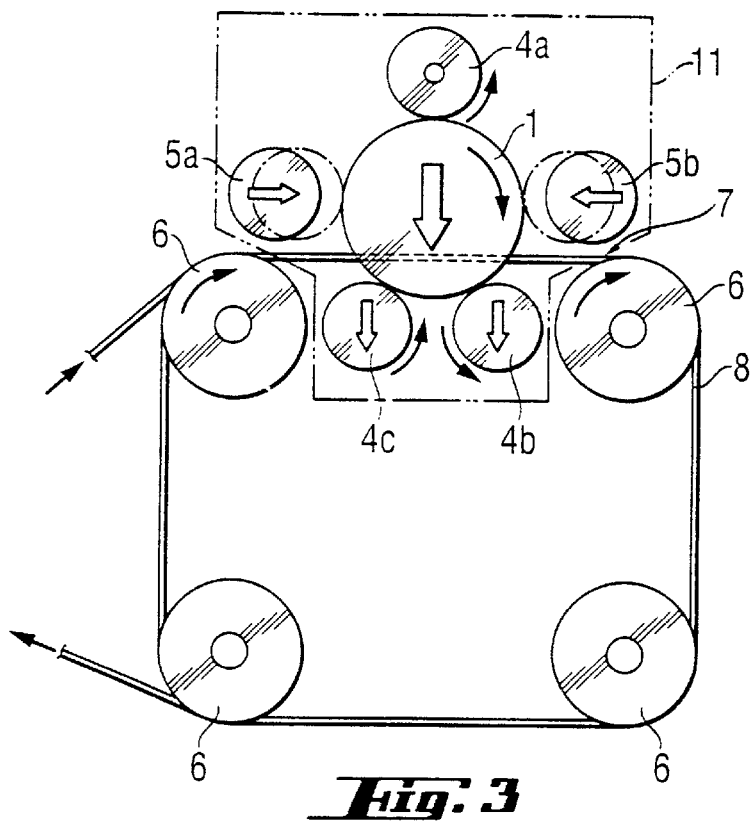
FIG. 3 shows a workpiece with wafers being cut off at a later time and from the same perspective as in FIG. 1.

FIG. 3 shows the wire saw with a feed device 11 which guides the rotating workpiece 1 through the wire web 7. Beyond a certain penetration depth, which preferably corresponds to half the diameter of the workpiece, some of the rollers take over the responsibility for supporting and rotating the workpiece. For this purpose, these rollers are designed as guide rollers 4a, 4b and 4c, which are provided with grooves, the distance between the grooves corresponding to the distance between adjacent wire sections 8 of the wire web. At least one of the guide rollers is driven, so that further rotation of the workpiece is ensured even without the spindle sleeves 3. The guide rollers 4a, 4b and 4c are pivoted toward the workpiece and take over the responsibility of rotating the workpiece.

After the workpiece has been cut through, i.e. at a time at which the sawing wire has moved, relative to the workpiece, through a distance which is slightly longer than half the diameter of the workpiece, the feed device 11 moves the workpiece 1 in the opposite direction to the feed movement, out of the wire web 7. During this movement, the guide rollers 4b and 4c remain below the wire web, while support rollers 5a and 5b, which are arranged above the wire web, are pivoted onto the workpiece in order to support the workpiece. In contrast to the guide rollers, the support rollers 5a and 5b do not necessarily have to be provided with grooves.

Figure 4:
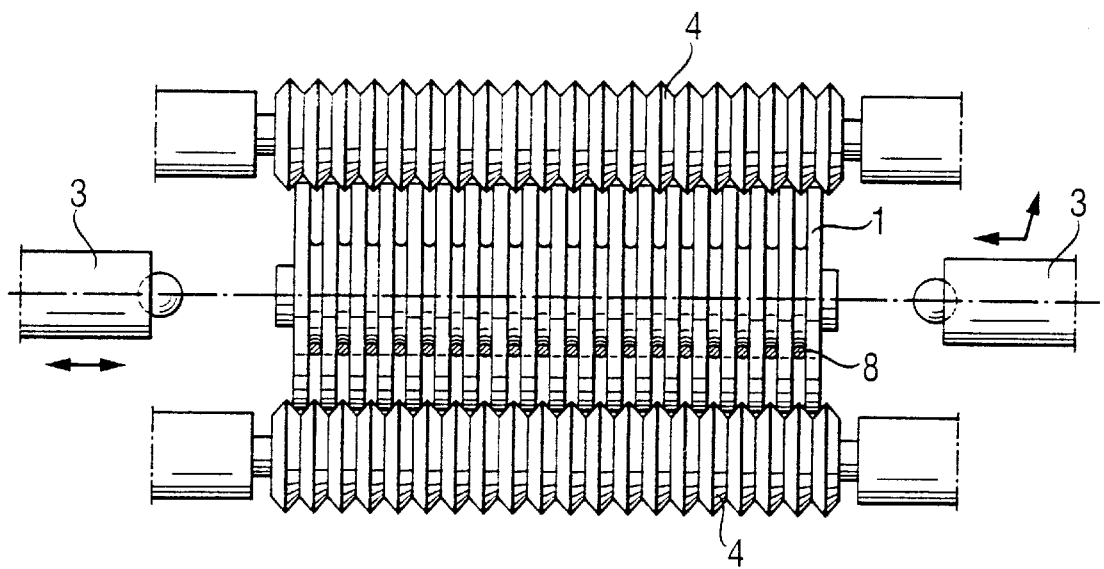
FIG. 4 shows the workpiece, which is held by guide rollers, shortly before the end of the operation of cutting off the wafers.

FIG. 4 shows how the spindle sleeves 3 are moved axially away from the workpiece 1 after the guide rollers 4 have pivoted in.

Figure 5:
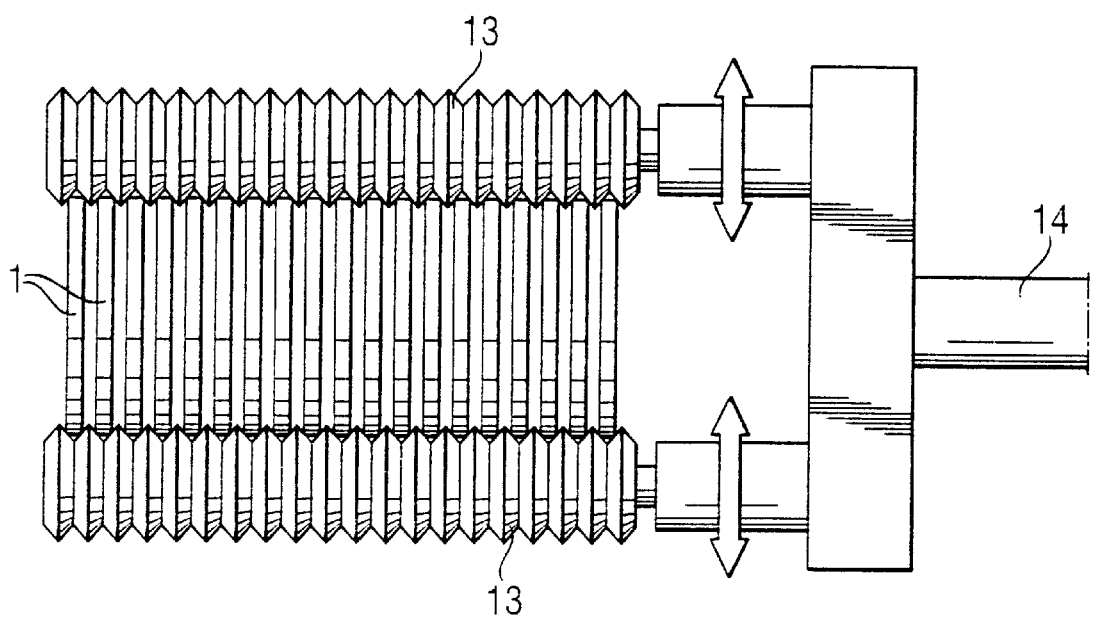
FIG. 5 shows a device for removing the wafers which have been cut off.

At the end of the method, the workpiece, which has been divided into wafers and is held by the rollers 4a, 5a and 5b, is received by a removal device. A preferred removal device is shown in FIG. 5 and comprises a conveyor arm 14 which is provided with conveyor rollers 13 at one end. To receive the wafers, the conveyor rollers are moved radially toward one another, coming into contact with the wafers, which have been cut off, at their edges.

The device shown in FIG. 6 differs from the device shown in FIG. 3 because of a pivoting segment 10, by means of which the workpiece, which is rotating about its longitudinal axis, can additionally be pivoted to and from about a further axis of rotation. The further axis of rotation is parallel to the longitudinal axis of the workpiece, preferably at the location where the sawing wire acts on the workpiece, or coincides with the longitudinal axis of the workpiece. The device illustrated is designed in such a manner that the workpiece, together with the feed device, can be pivoted about a pivot point M, the pivoting segment 10 being arranged at the distance R.

The device shown in FIG. 7 differs from the device shown in FIG. 6 because of the feed device 12 (cutting head feed), which moves the cutting head (the wire-guide rollers 6 and the wire web 7) toward the workpiece 1, which remains immobile in translational terms. In the device illustrated, the wire web may additionally be pivoted about the pivot point M, the cutting head lying within the pivoting radius R and being pivoted along about M.

FIG. 8 illustrates an embodiment of the method in which a plurality of workpieces which are formed as hollow bodies, for example hollow cylinders made from silicon carbide, are cut into wafers. Each hollow workpiece 1 is joined to a support body 15 by way of its inner peripheral surface Pi. The attachment of the support body to the inner peripheral surface creates a particularly stable joining between the workpiece and the support body. For the wafers to be cut off, the support body is set in rotation by a drive (not shown).

In the exemplary embodiment illustrated, the workpieces 1 are arranged next to one another in such a way that their longitudinal axes intersect at right angles a straight line which is parallel to the wire web 7. The arrows drawn over the wire web symbolize the supply of a slurry 16. The dashed line leading from one arrow to a workpiece illustrates the T.A.El path—the droplet enrichment or droplet preparation is generally known in the microanalysis of surfaces (See Slurry Papers). The slurry supply shown has the advantage that slurry is not only transported into the sawing gap by the sawing wire, but also moves directly into the sawing gap from above. The slurry may also be guided onto each individual workpiece between the workpieces. It is also easier to remove abraded material and wire, since such materials are able to flow away downward with the slurry.

The removal of the residual support body from the wafers which have been cut off can easily be automated, since the wafers are guided on the support body.

Accordingly, while a few embodiments of the present invention have been shown and described, it is to be understood that many changes and modifications may be made thereunto without departing from the spirit and scope of the invention as defined in the appended claims.

What is claimed is:

1. A method for simultaneously cutting off a multiplicity of wafers from a hard, brittle workpiece which has a longitudinal axis and an outer peripheral surface comprising
    guiding the workpiece by a relative translational movement, directed perpendicular to the longitudinal axis, between the workpiece and a wire web of a wire saw with a feed device, through the wire web which is formed by a sawing wire;
    rotating the workpiece about the longitudinal axis while the wafers are being cut off; and
    holding the workpiece by spindle sleeves at beginning of cutting off the wafers and holding the workpiece by rollers at end of the cutting off of the wafers; and
    the spindle sleeves clamping the workpiece axially and the rollers supporting the workpiece on the outer peripheral surface.

2. The method as claimed in claim 1,
    wherein the outer peripheral surface is not joined to a support body during rotating of the workpiece.

3. The method as claimed in claim 1,
    wherein the workpiece is rotated through an angle which is greater than 0°.

4. The method as claimed in claim 1, comprising
    joining the workpiece on the outer peripheral surface to a support body; and
    rotating the workpiece through an angle which is greater than 0° and less than 360°.

5. The method as claimed in claim 1, comprising
    rotating the workpiece in a direction of rotation; and
    reversing the direction of rotation periodically to produce an opposite direction.

6. The method as claimed in claim 5, comprising
    rotating the workpiece for a longer time in one direction than in the opposite direction.

7. The method as claimed in claim 1, further comprising
    pivoting the workpiece about an axis of rotation which is parallel to the longitudinal axis of the workpiece.

8. The method as claimed in claim 7,
    wherein the axis of rotation about which the workpiece is pivoted is at a location at which the saw wire penetrates into the workpiece.

9. The method as claimed in claim 1, comprising
    cutting off the wafers by using a slurry with the sawing wire.

10. The method as claimed in claim 1, comprising
    cutting off the wafers by using abrasive grain; and the abrasive grain being bonded to the sawing wire.

11. The method as claimed in claim 1, comprising
    moving the workpiece toward the wire web by using the feed device.

12. The method as claimed in claim 1, comprising
moving the wire web toward the workpiece by using of the feed device.

13. A wire saw comprising
- a wire web made from a sawing wire for simultaneously cutting off a multiplicity of wafers from a hard, brittle workpiece;
- a feed device, which effects a relative translational movement, directed perpendicular to a longitudinal axis of the workpiece, between the workpiece and the wire web of the wire saw, in the course of which movement the workpiece is guided through the wire web;
- a device for holding the workpiece and for rotating the workpiece about the longitudinal axis, comprising spindle sleeves and rollers which are arranged in such a manner that they can be moved toward the workpiece and away from the workpiece; and
- said spindle sleeves clamping the workpiece axially and said rollers supporting the workpiece on a peripheral surface.

14. The wire saw as claimed in claim 13, further comprising
- a pivoting device with a pivoting segment for pivoting the workpiece about an axis of rotation.

15. The wire saw as claimed in claim 13, further comprising
- a removable device for holding the wafers which have been cut off, comprising a conveyor arm which at one end is provided with conveyor rollers.

16. A method for simultaneously cutting off a multiplicity of wafers from hard, brittle workpieces which are hollow bodies and have longitudinal axes and inner peripheral surfaces comprising;
- joining the workpieces to support bodies along the inner peripheral surfaces;
- placing the workpieces next to one another;
- rotating the workpieces by rotating the support bodies;
- guiding the workpieces by a relative translational movement, directed perpendicular to the longitudinal axes, between the workpieces and a wire web of a wire saw with a feed device, through the wire web which is formed by a sawing wire, thereby cutting off the wafers form the workpieces simultaneously;
- penetrating the sawing wire into the support bodies after the wafers have been cut off, without cutting all the way through the support bodies.

17. The method as claimed in claim 16, comprising
- placing a plurality of workpieces next to one another, with the longitudinal axes of the workpieces intersecting a straight line at right angles; and
- cutting off the wafers from the workpieces simultaneously.

18. The method as claimed in claim 16, comprising
- placing a plurality of workpieces next to one another, with longitudinal axes of the workpieces intersecting a curved line at right angles, and curvature of the curved line corresponding to a bending of the wire web when the wafers are being cut off; and
- cutting off the wafers from the workpieces simultaneously.

\* \* \* \* \*